United States Patent [19]  [11] 4,183,071
Russell  [45] Jan. 8, 1980

[54] CONTROL CIRCUIT FOR RESETTING CIRCUIT BREAKER UVR SOLENOID

[75] Inventor: Ronald R. Russell, Plainville, Conn.

[73] Assignee: General Electric Company, New York, N.Y.

[21] Appl. No.: 912,623

[22] Filed: Jun. 5, 1978

[51] Int. Cl.² .............................................. H02H 3/24
[52] U.S. Cl. ...................................... 361/59; 361/71; 361/92
[58] Field of Search .................. 361/59, 92, 194, 187, 361/71, 73, 74, 75, 86, 88, 90; 340/663

[56] References Cited

U.S. PATENT DOCUMENTS

| | | | |
|---|---|---|---|
| 3,105,919 | 10/1963 | Werts | 361/92 |
| 3,590,325 | 6/1971 | McMillen et al. | 361/92 |
| 3,718,839 | 2/1973 | Conti et al. | 361/92 |
| 3,757,202 | 9/1973 | Prouty et al. | 361/92 |
| 3,772,568 | 11/1973 | Phillips | 361/59 |
| 4,011,484 | 3/1977 | Paice et al. | 361/59 |

Primary Examiner—Patrick R. Salce
Attorney, Agent, or Firm—Robert A. Cahill; Walter C. Bernkopf; Philip L. Schlamp

[57] ABSTRACT

DC control voltage derived from the system voltage activates a first relay to apply the control voltage across a dropping resistor and an undervoltage release (UVR) solenoid, thereby holding the UVR solenoid in while the system voltage remains above a minimum level. An energy storage RC network holds the UVR solenoid in for momentary drops in system voltage. In the event of a protracted system undervoltage condition, the first relay drops out to drop out the UVR solenoid and trip a system circuit breaker. When nominal system voltage is restored, the control voltage activates the first relay and, via an RC charging circuit, temporarily actuates a second relay to switch out the dropping resistor, thereby temporarily applying full control voltage across the UVR solenoid to reset it.

9 Claims, 1 Drawing Figure

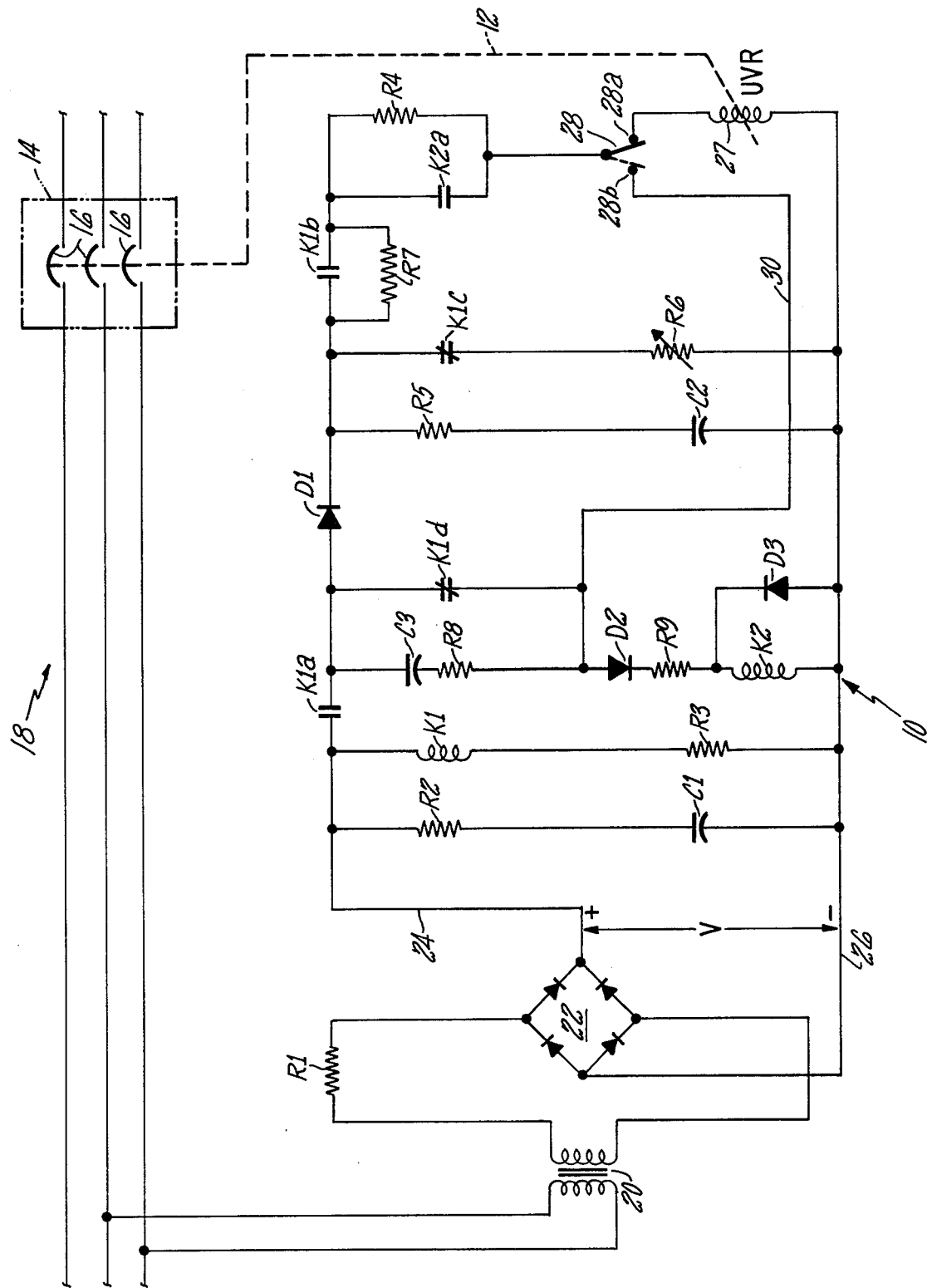

4,183,071

CONTROL CIRCUIT FOR RESETTING CIRCUIT BREAKER UVR SOLENOID

BACKGROUND OF THE INVENTION

The present invention relates to undervoltage protection for power distribution circuits feeding voltage sensitive loads, such as motors.

Typically undervoltage protection is provided by a so-called "undervoltage release" (UVR) device, such as a solenoid whose operating coil is connected to be energized by the distribution circuit voltage. If the system voltage remains above a predetermined minimum level, the solenoid coil is sufficiently energized to magnetically hold in the solenoid plunger against the bias of a calibrated retracting spring. When the system voltage falls below the predetermined minimum level, the retracting spring overpowers the diminished magnetic attractive forces developed by the solenoid coil, and the plunger is retracted. In the process, the plunger strikes a latch, tripping a circuit breaker to interrupt the distribution circuit. When the system voltage is returned to normal, the magnetic attractive forces developed by the UVR solenoid coil are not sufficient to pull the plunger in. Consequently, the plunger must be reset mechanically, usually coincidentally with the opening movement of the breaker contact or the resetting of the breaker operating mechanism preparatory to reclosure of the breaker contacts.

The principal disadvantage to this straightforward approach to undervoltage protection is the inability of the undervoltage release solenoid to hold in for harmless, momentary dips in the system voltage or momentary losses of system power. Unless a mechanical dashpotting arrangement is provided, the UVR solenoid plunger will, under these circumstances, be pulled out by its retracting spring and the circuit breaker needlessly tripped. To overcome this disadvantage undervoltage protection control circuits have been provided for developing a DC control voltage proportional to the system voltage which is then utilized to hold a UVR solenoid in as long as the system voltage remains above the pre-established minimum level. An energy storage capacitor, charged by the DC control voltage, is connected across the UVR solenoid coil. During momentary dips or losses of system voltage, the energy storage capacitor discharges through the UVR solenoid coil to hold it in. Using this approach, UVR solenoid drop-out delays of up to eight seconds can be readily achieved.

The utilization of an undervoltage protection control circuit lends practicability to an electrical approach, rather than a mechanical approach, to resetting the UVR solenoid after it has operated to trip the circuit breaker. One such approach is to apply the DC control voltage across the UVR solenoid coil and a series voltage dropping resistor, such that the voltage across the UVR coil is approximately one-half the control voltage but nevertheless sufficient to hold the UVR solenoid plunger in. The dropping resistor is shunted by a large electrolytic capacitor. Upon restoration of nominal system voltage and then DC control voltage after the UVR solenoid has dropped out, the electrolytic capacitor effectively bypasses the dropping resistor to apply full control voltage across the UVR solenoid coil which is sufficient excitation to magnetically pull the plunger in to its seated, reset position against the bias of its retracting spring. As this electrolytic capacitor charges up, the voltage across the dropping resistor rises exponentially nd the voltage across the UVR solenoid falls exponentially toward their respective normal operating levels.

While this UVR solenoid resetting approach is simple and straightforward, it is not without problems. Full control voltage is applied to the UVR solenoid coil only briefly, i.e., while the resetting capacitor is fully discharged. This limits the maximum pull-in force to a very brief, initial period, and it decreases as the square of the exponentially decreasing capacitor charging current. Consequently, the electrical resetting of the UVR solenoid can be a tenuous proposition. Moreover, the electrolytic resetting capacitor is prone to lose its dielectric properties if left inactive for long periods of time. Under this circumstance, the sudden application of control voltage can precipitate its failure. Furthermore, an electrolytic capacitor is a large, excessively space consuming component which presents serious packaging problems.

It is accordingly an object of the present invention to provide an improved undervoltage protection control circuit for power distribution systems.

A further object is to provide an undervoltage protection control circuit of the above character wherein electrical resetting of a UVR solenoid is effected in an efficient, reliable manner.

An additional object is to provide an undervoltage protection control circuit of the above character which is capable of providing varying, protracted UVR solenoid drop-out delays.

Yet another object is to provide an undervoltage protection control circuit of the above character which is equipped to further accommodate shunt tripping of a circuit breaker via the UVR solenoid.

A still further object of the present invention is to provide an undervoltage protection control circuit of the above character which is inexpensive to manufacture, efficient and reliable in operation, and compact in size.

Other objects of the invention will in part be obvious and in part appear hereinafter.

SUMMARY OF THE INVENTION

In accordance with the present invention, there is provided a UVR solenoid control circuit for affording undervoltage protection to a power distribution system feeding voltage sensitive loads. The undervoltage protection control circuit is energized by a DC control voltage derived from and proportional in magnitude to the distribution circuit voltage. If the system voltage is in excess of a predetermined minimum level, the control voltage is of a magnitude sufficient to hold in a first control relay. Normally open contacts of this relay remain closed to apply the control voltage across a UVR solenoid coil and a series voltage dropping resistor, pursuant to developing sufficient holding voltage to hold the UVR solenoid in. If the system voltage falls below the predetermined minimum level, the first control relay drops out to remove control voltate from the UVR solenoid. To prevent immediate drop out of the UVR solenoid and consequent tripping of a circuit breaker wired into the distribution system, an energy storage capacitor, previously charged by the control voltage, discharges through the UVR solenoid coil to develop the requisite holding voltage for a duration adjustably determined by the resistance included in the capacitor discharge path. If the system voltage returns to its nominal value before this capacitor discharges, the first control relay picks up to again apply full control voltage across the UVR solenoid coil and series dropping resistor, and the UVR solenoid does not drop out. On the other hand, if the distribution system is experiencing a serious undervoltage condition, the UVR solenoid will eventually drop out to trip the circuit breaker.

When full system voltage is eventually restored, the first control relay picks up to apply full control voltage across the UVR solenoid coil and dropping resistor. At the same time, control voltage is applied across the series combination of a small resetting capacitor and the operating coil of a second control relay. Charging current drawn by this capacitor picks up the second control relay and its contacts close to shunt out the dropping resistor. Consequently, full control voltage is applied directly across the UVR solenoid coil for the time it takes to substantially charge the resetting capacitor; more than ample time to reliably, electrically reset the UVR solenoid. As the resetting capacitor approaches a fully charged condition, the second control relay drops out to switch the dropping resistor back into the control circuit. The voltage across the UVR solenoid coil abruptly drops to the holding voltage level sufficient to hold the UVR solenoid plunger in.

As an additional feature of the present invention, the control circuit further includes a switch which can be selectively operated to remove the holding voltage from the UVR solenoid when it is desired to shunt trip the circuit breaker. This switch, when so operated, establishes a discharge path for the resetting capacitor to insure its fully discharged condition in order that reliable resetting of the UVR solenoid can be effected when this switch reconnects the UVR solenoid coil back into the control circuit.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawing, in which the sole FIGURE is a detailed circuit schematic diagram of an undervoltage protection control circuit embodying the present invention.

DETAILED DESCRIPTION

Referring now to the drawing, an undervoltage protection control circuit, generally indicated at 10, is adapted to control an undervoltage release solenoid UVR having a plunger, diagrammatically indicated at 12, mechanically coupled to trip a power circuit breaker, generally indicated at 14, and thus effect the opening of its internal contacts 16 pursuant to interrupting a power distribution system 18 experiencing a harmful undervoltage condition. To monitor the distribution system voltage, the primary of a voltage step-down transformer 20 is connected across two phases of the three-phase distribution system. The secondary of this transformer is connected via a current limiting resistor R1 across the input of a full-wave diode rectifying bridge, generally indicated at 22. Appearing across a positive voltage bus 24 and a negative voltage bus 26 is a DC control voltage V of a magnitude directly related to the distribution system voltage. Connected across buses 24 and 26 is an RC filtering network, consisting of resistor R2 and capacitor C1. Also connected across buses 25 and 26 is a control relay K1 and a resistor R3. If the system voltage is of a magnitude in excess of a predetermined minimum level, the DC control voltage is of sufficient magnitude to pick up relay K1, causing its normally open contacts K1a and K1b to close. As a consequence, DC control voltage is applied via these relay contacts and diode D1 across the series combination of a voltage dropping resistor R4 and the operating coil 27 of the UVR solenoid, assuming switch 28 to be in its solid line position. The resistance value of dropping resistor R4 is selected such that under normal operating conditions, the control voltage develops a holding voltage across solenoid coil 27 sufficient to hold plunger 12 in against the bias of its retracting spring (not shown). Consequently, the contacts 16 of circuit breaker 14 remain closed to accommodate the distribution of electrical power over system 18.

In the event the system voltage falls below the predetermined minimum level or is lost completely, the consequent reduction or loss in DC control voltage V causes control relay K1 to drop out. The opening of its contacts K1a and K1b disconnects the UVR solenoid from the output of diode bridge 22. Should the system voltage reduction be only temporary, it is highly desirable that the UVR solenoid not drop out under these circumstances and needlessly trip circuit breaker 14. To accommodate these momentary system voltage reductions or losses, the series combination of a resistor R5 and an energy storage capacitor C2 is connected across buses 24 and 26 at a point just downstream from diode D1. Also connected across buses 24 and 26 is the series combination of normally closed contacts K1c of relay K1 and an adjustable resistor R6. A resistor R7 is connected across contacts K1b of control relay K1. It is seen that when control relay K1 first picks up, energy storage capacitor C2 is rapidly charged through closed relay contacts K1a, diode D1 and resistor R5 to store a voltage substantially equal to the control voltage magnitude. When the control voltage drops in response to a system voltage reduction and control relay K1 drops out, it is seen that capacitor C2 begins discharging through resistor R5, resistor R7, resistor R4, switch 28 and the UVR solenoid coil to prevent immediate drop out of the UVR solenoid plunger 12. The rate at which capacitor C2 discharges and thus the drop-out delay imposed on the UVR solenoid is made adjustable by varying the resistance of resistor R6 included in the shunt discharge path imposed by closure of relay contacts K1c of control relay K1. Diode D1 prevents the capacitor C2 discharge current from flowing to the left on bus 24. It is seen that if nominal system voltage is restored before energy storage capacitor C2 substantially discharges, control relay K1 again picks up to reimpose full control voltage across series dropping resistor R4 and the UVR solenoid coil. Consequently, the UVR solenoid plunger 12 is held in for temporary system voltage reductions or losses, and circuit breaker 14 is not needlessly tripped.

On the other hand, if nominal system voltage is not restored before capacitor C2 substantially discharges, the UVR solenoid plunger will indeed drop out to trip circuit breaker 14 and interrupt the distribution system 18 in the face of a potentially harmful undervoltage condition.

Once the UVR solenoid plunger 12 has dropped out and precipitated tripping of circuit breaker 14, it becomes necessary to reset the UVR solenoid by returning its plunger to its attracted, reset position. To achieve UVR solenoid resetting electrically in accordance with the present invention, the series combination of a small, non-electrolytic capacitor C3, resistor R8, diode D2, resistor R9, and the operating coil for a second control relay K2 is connected across buses 24 and 26 at a point just downstream from relay contacts K1a of control relay K1. The operating coil of control relay K2 is shunted by free-wheeling diode D3, while capacitor C3 and resistor R8 are shunted by normally closed contacts K1d of control relay K1. The second control relay K2 includes normally open contacts K2a connected in shunt with voltage dropping resistor R4. It is seen that when system voltage is restored to its nominal value, the DC control voltage V pulls in the first control relay K1, and its contacts K1a and K1d close and open, respectively, to enable charging of capacitor C3. This charging current flows through the relay K2 operating coil, causing it to pick up and close its contacts K2a. The dropping resistor R4 is thus switched out of the circuit and the DC control voltage, rather than being applied across the series combination of the dropping resistor and the UVR solenoid coil, is imposed directly across the UVR solenoid coil. The rate at which capacitor C3 charges, and thus the duration during which sufficient charging current flows through control relay K2 to hold it in is established by the values of resistors R8 and R9, and in turn determines the interval during which full control voltage is applied directly across the UVR solenoid coil. I have found a half-second interval to be appropriate. With full control voltage being applied as the UVR solenoid pull-in voltage over a predetermined time interval, rather than an exponentially decaying pull-in voltage over a corresponding duration as in the above-noted prior art resetting approach, it is seen that reliable UVR solenoid resetting is achieved. As resetting capacitor C3 approaches full charge, the charging current drops below a level sufficient to hold the second control relay K2 in, and it drops out to effect opening of its contacts K2a. Dropping resistor R4 is thus switched back into the circuit, and the voltage across the UVR solenoid coil drops to the normal holding voltage level sufficient to hold in the reset UVR solenoid plunger 12. The inclusion of diode D2 in the charging circuit for capacitor C3 is for the purpose of preventing this capacitor from drawing current through the relay K2 operating coil in response to the ripple in the full-wave rectified control voltage V during steady state operation. It will be noted that while the first control relay K1 is dropped out, its contacts K1d close to shunt resetting capacitor C3 and thereby insure that it is fully discharged at the time it is called upon to electrically reset the UVR solenoid plunger 12.

As an additional feature of the present invention, control circuit 10 includes switch 28, indicated as a single pole, double throw switch, which may be advantageously utilized to shunt trip circuit breaker 14 via the UVR solenoid. It is seen that if switch 28 is manually or electrically from a remote location switched from its solid line position engaging switch contact 28a to its phantom line position engaging switch contact 28b, holding voltage is removed from the UVR solenoid and it drops out. Circuit breaker 14 is thus tripped irrespective of the system voltage.

To insure that resetting capacitor C3 is substantially discharged and thus capable of effecting resetting of the UVR solenoid when switch 28 is returned to its solid line position, switch contact 28b is wired via lead 30 to the junction between resistor R8 and diode D2. Control relay K2 is thus actuated, and its contacts K2a close to complete a discharge path for resetting capacitor C3. Thus, when switch 28 is positioned to contact 28a connecting the UVR solenoid coil 27 back into the circuit, resetting capacitor begins charging to temporarily hold control relay K2 and thus effect resetting of the UVR solenoid.

Form the foregoing description, it is seen that the present invention provides a UVR solenoid resetting circuit wherein momentary removal of the dropping resistor is achieved by temporarily actuating control relay K2 via the charging current of a small fixed filin capacitor C3, e.g. 1 microfarad, made possible due to the relatively high DC resistance of the relay K2 operating coil. Moreover, resistor R9 can be made large, e.g. 51 kilohms, so as to provide a large charging time constant using a small resetting capacitor. This is contrasted with the above-noted prior art approach of shunting the dropping resistor with a capacitor, such that the UVR solenoid is reset via the charging current of this capacitor. Since the DC resistance of a UVR solenoid coil is quite low, a very large capacitor is required, e.g. 1000 microfarads, and the practical capacitors having capacitances of this magnitude are electrolytic capacitors.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A circuit for controlling an undervoltage release (UVR) solenoid having a plunger mechanically coupled to trip a circuit breaker in response to an undervoltage condition, said circuit including, in combination:
   A. first and second buses having input ends coupled to the distribution system pursuant for developing thereacross a DC control voltage proportional to the system voltage;
   B. a first control relay having an operating coil connected between said first and second buses to be actuated by said control voltage so long as said system voltage remains above a predetermined minimum level, said first control relay further including normally open first contacts connected in said first bus downstream from said first control relay operating coil;
   C. the series combination of a dropping resistor and the UVR solenoid coil connected across said first and second buses downstream from said first contacts of said first control relay, whereby actuation of said first control relay closes its first contacts to apply said control voltage across said series combination pursuant to developing sufficient holding voltage across the UVR solenoid coil to hold its plunger in and thus preclude tripping of the circuit breaker;
   D. a UVR solenoid drop-out delay network including an energy storage capacitor connected across said first and second buses intermediate said first contacts of said first control relay and said dropping resistor-UVR solenoid coil series combination whereby upon deactuation of said first control relay in response to the system voltage falling below said predetermined minimum level, said energy storage capacitor discharges through the UVR solenoid coil to hold its plunger in for a predetermined duration pending restoration of normal system voltage; and E. a UVR solenoid resetting network including
   (1) a resetting capacitor,
   (2) a second control relay having
      (a) an operating coil connected in series with said resetting capacitor across said first and second buses downstream from said first contacts of said first control relay, and
      (b) normally open contacts connected in shunt with said dropping resistor,
   (3) whereby, upon restoration of normal system voltage following tripping of the circuit breaker by the UVR solenoid in response to a protracted undervoltage condition, said first control relay is actuated to close its first contacts and said resetting capacitor begins charging toward the control voltage, the charging current temporarily actuates said second control relay to close its contacts shunting said dropping resistor such that full control voltage is applied across the UVR solenoid coil for the interval required to substantially charge said resetting capacitor to insure magnetic attraction of the UVR plunger to the reset position.

2. The undervoltage release solenoid control circuit defined in claim 1, wherein said first control relay includes normally closed second contacts shunting said resetting capacitor.

3. The undervoltage release solenoid control circuit defined in claim 2, wherein said first control relay further includes normally closed third contacts connected in series with an adjustable resistor across said energy storage capacitor.

4. The undervoltage release solenoid defined in claim 3, wherein said first control relay further includes normally open fourth contacts connected in shunt with a fixed resistor and operating to switch said fixed resistor into the discharge current path for said energy storage capacitor.

5. The undervoltage release solenoid control circuit defined in claim 2, wherein said resetting network further includes a resistor and a diode connected in series with said resetting capacitor and said second control relay operating coil across said first and second buses.

6. The undervoltage release solenoid control circuit defined in claim 5, which further includes a circuit breaker shunt trip switch connected between said dropping resistor and UVR solenoid coil, said switch being normally in a position connecting said dropping resistor in series with said UVR solenoid coil and being operable to a shunt trip position disconnecting said dropping resistor from said UVR solenoid coil.

7. The undervoltage release solenoid control circuit defined in claim 6, wherein said switch is wired to complete an energization circuit for said second control relay and further to provide a discharge path for said resetting capacitor.

8. The undervoltage release solenoid control circuit defined in claim 7, wherein said first control relay further includes normally closed third contacts connected in series with an adjustable resistor across said energy storage capacitor.

9. The undervoltage release solenoid defined in claim 8, wherein said first control relay further includes normally open fourth contacts connected in shunt with a fixed resistor and operating to switch said fixed resistor into the discharge current path for said energy storage capacitor.

* * * * *